United States Patent [19]
Frederiksen et al.

[11] 3,952,279
[45] Apr. 20, 1976

[54] SONAR SYSTEM FOR USE BY FISHERMEN AND THE LIKE

[75] Inventors: Thomas M. Frederiksen, San Jose; William M. Howard, Campbell, both of Calif.

[73] Assignee: National Semiconductor Corporation, Santa Clara, Calif.

[22] Filed: May 17, 1974

[21] Appl. No.: 470,999

[52] U.S. Cl................................ 340/3 R; 340/3 A
[51] Int. Cl.².......................................... G01S 9/70
[58] Field of Search............................ 340/3 R, 3 A

[56] References Cited
UNITED STATES PATENTS
3,764,962  10/1973  Bartel, Jr. ........................... 340/3 R

*Primary Examiner*—Richard A. Farley
*Attorney, Agent, or Firm*—Lowhurst & Aine

[57] ABSTRACT

A sonar system utilizing a common LC tuned circuit for both the transmitter portion and the receiver portion of the electronic system so that both receiver and transmitter are tuned to the same frequency. The transducer is isolated from the LC tuned circuit so that the impedance characteristics of the transducer will not operate to change the main frequency of the tuned circuit. Thus interchangeable transducers may be utilized with the receiver-transmitter circuitry. The transmitter power pulses are generated by a novel Class C pulse circuit providing short time width, high intensity power pulses to the transducer.

19 Claims, 3 Drawing Figures

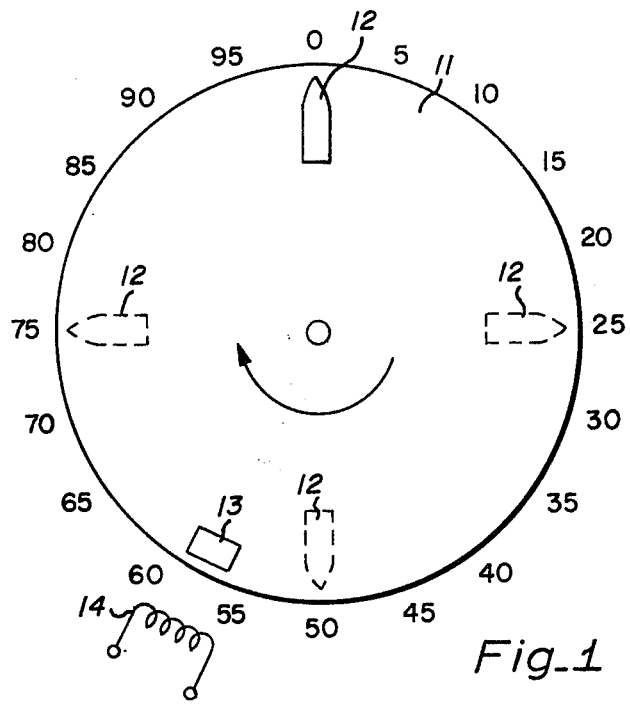
Fig_1
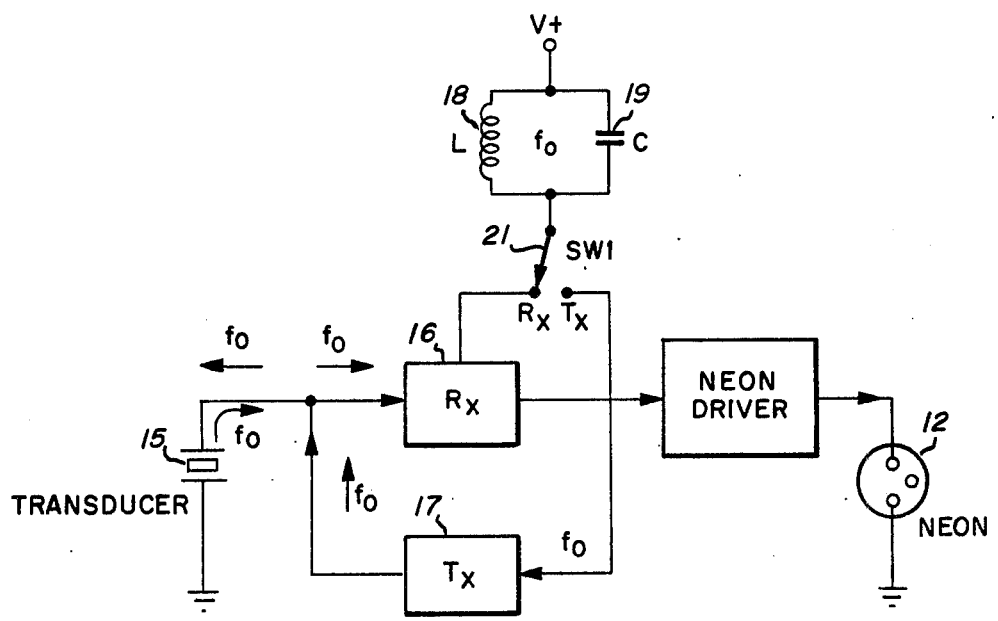
Fig_2

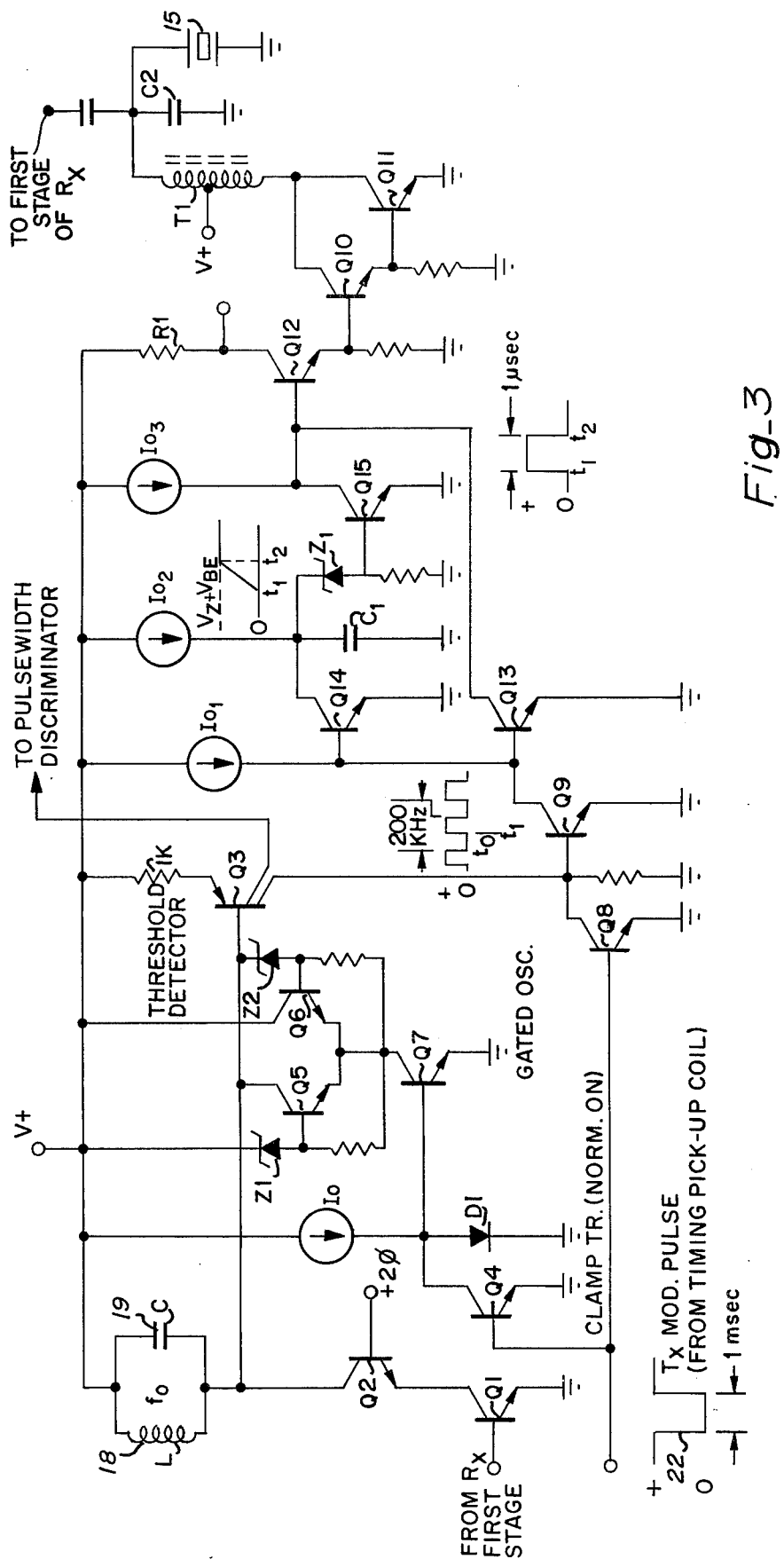
Fig_3

SONAR SYSTEM FOR USE BY FISHERMEN AND THE LIKE

BACKGROUND OF THE INVENTION

Sonar systems presently exist for use by fishermen in determining the depth of the lake bottom below their boat and also the presence and depth of fish, if any, between the boat and the bottom. Knowledge of the lake or river depth, along with a knowledge of the water temperature and fish feeding habits, are of great aid to fishermen.

Such sonar systems utilize a transducer that converts a transmitted electrical frequency pulse signal, such as 200 KHz, into a sound signal at the boat and directs the sound signal down through the water. The transducer will then receive back an echo signal from the lake bottom, the length of the passage of time between the transmittal of the sound pulse and the receipt of the echo pulse being a direct measure of the distance from the boat to the lake bottom.

The present systems incorporate a suitable distance calibration device that gives a reading to the fishermen directly in feet.

Such systems provide a radio frequency transmitter for delivering the radio frequency electrical energy to the transducer that then converts the electrical signal to a sound signal at the same radio frequency. A receiver circuit is also provided coupled to the transducer to convert the sound echo signal to electrical energy for operation of the suitable signal indication to the fishermen.

The principal problem with existing sonar systems stems from the fact that the transmitter sections and the receiver sections of the system incorporate LC tuned circuits to establish the desired frequency band of the generated and received signal of, for example, 200KHz ± 20 KC. However, the sound transducer incorporates impedance characteristics of its own, such as induction and capacitance, and each transducer must be carefully matched with the transmitter-receiver circuitry to give the desired frequency output. Careful frequency alignment is needed during the initial manufacture of the sonar system, and variations introduced by the fishermen during use, such as a different length or size of connector cable between the electronics and the transducer, can result in miscalibration of the unit. More important, different transducers cannot be substituted into the sonar system without returning the unit to the repair shop for realignment. Thus broken or lost transducers cannot be easily replaced. Also, separate transducers cannot be permanently mounted on separate boats with the electronics package portable from one boat to another.

Still another problem with existing sonar systems is the fact that the transmitter utilizes one LC tuned circuit to produce the desired transmitter pulse frequency and the receiver utilizes a second LC tuned circuit tuned to the frequency of the r.f. signal received from the transducer responsive to the received echo sound. Various factors such as heat and time change the frequency of tuning of these tuned circuits so that they no longer match, and the calibration of the sonar system degenerates.

SUMMARY OF THE PRESENT INVENTION

The present invention provides a novel method and means whereby the tuning circuitry in the transmitter and receiver portions of the sonar system are isolated from the impedance characteristics of the sound transducer. In this manner, inductive and capacitive characteristics of the transducer itself have no significant effect upon the frequency determining characteristics of the radio frequency tuned circuitry of the transmitter and receiver sections of the system. Because of this independence from different transducers, which may have significantly different impedance characteristics, the transmitter and receiver circuitry of the system may be used interchangeably with different transducers without the necessity of realignment of the frequency determining circuitry. A lost transducer may be easily replaced without realignment; a single transmitter-receiver electronic system may be used interchangeably with transducers on different boats.

As another feature of the present invention, a novel method and means is employed wherein a single LC tuned circuit is utilized for both the transducer frequency determining circuitry and for the receiver frequency determining circuitry; the LC tuned circuit is switched to the transmitter circuit during the transmitter pulse period and thereafter switched to the receiver circuit during the remaining time when the sonar system awaits the returning echo signal. Since one LC circuit tunes both transmitter and receiver, the frequency of operation of transmitter and receiver tracks with time, heat and the like and is always matched.

As another feature of the invention, the transmitter section incorporates an oscillator circuit with a frequency controlled by the common tuning circuit, the oscillator in turn activating a class C pulse circuit with a short time width, high intensity driving power pulse to the transducer whereby high intensity transmitter pulses at the desired transmitter frequency are developed by the transducer.

BRIEF DESCRIPTION OF THE DRAWINGS

FIG. 1 is a distance calibration element for the sonar system.

FIG. 2 is a block diagram of the present invention.

FIG. 3 is a circuit diagram of a preferred embodiment of the invention.

DESCRIPTION OF THE PREFERRED EMBODIMENTS

Referring now to FIG. 1 there is shown the distance calibration face of a typical known sonar system utilized by fishermen. It comprises a rotating disk 11 which is rotating rapidly at a known rate. Around the outside of the periphery of the disk are equally spaced markings 0 to 95 denoting distance in feet. For example, one quarter rotation of the disk 11 denotes a distance of 25 feet, half rotation 50 feet, and one full rotation 100 feet. A light 12, such as a neon flasher, is mounted on the periphery of the disk 11 for rotation therewith. If the neon flasher is momentarily lit when the sonar pulse is first transmitted and when the lamp is aligned with the zero distance marking, a momentarily relighted neon light responsive to the received echo signal when the disk has rotated 180° will signify a water depth of 50 feet; a relighted neon lamp after a full 360° rotation signifies a 100 foot depth.

A small magnet 13 attached to the rotating disk and a coil of wire 14 past which the magnet 13 sweeps generates the transmission trigger pulse at the moment the neon flasher light 12 is aligned with the zero distance marker 0.

Referring now to FIG. 2 there is shown a block diagram of the preferred embodiment of the present invention. The sound transducer 15 is coupled to the receiver circuitry 16 and to the transmitter circuitry 17. The output of the receiver circuit 16 is coupled via a neon driver circuit to the neon flasher lamp 12.

A tuning circuit comprising an inductor 18 and capacitor 19 with a resonant frequency $f_o$ can be switched between the receiver circuit 16 and the transmitter circuit 17 by means of a switching means 21.

Referring now to FIG. 3, the transmitter modulation pulse is shown as 22, this pulse being about 1 millisecond long and being produced by the interaction of the magnet 13 and coil 14. Only during the 1 millisecond is the transmitter on; the remaining time during a cycle of operation the receiver is activated waiting for the return of the echo pulse from the transducer 15 via coupling capacitor 20 coupled to the first stage of the receiver $R_x$ 16. Since the receiver action of the circuitry is more easily described, it will be assumed that a transmit pulse has been sent and the system is in the receiver mode of operation. The receiver circuitry includes a first amplifier stage leading to the base of the second amplifier transistor Q1; Q2 is a cascoding transistor for the circuit having its base biased to $+2\phi$ ($+2V_{BE}$) and such bias being switched to ground potential to serve as switch 21 of FIG. 2 for discoupling the tuned circuit 18 and 19 from the receiver as shown in FIG. 2. There is therefore a transistor amplifier Q1 tied to the frequency fo determining tuning network 18, 19 and thus selectively tuned to the frequency $f_o$ of the awaited echo signal. The output of this circuit is coupled to the base of the threshold detector transistor Q3. With no r.f. received signal present, the base of Q3 is tied directly through inductor 18 to the power supply V+ and the emitter of Q3 is about the same voltage so Q3 is turned off and thus normally sits in the off condition.

When a valid r.f. echo signal is received, an AC component appears on the lead to the base of Q3 and the first time the voltage goes below the supply by one diode drop, $1V_{BE}$, transistor Q3 turns on and an output is transmitted via the upper collector lead of Q3 to a pulse width discriminator circuit and associated noise rejection circuitry to the neon driver circuit 17 to light the neon lamp. As explained above, the lamp has been rotating with the disk 11 and will flash at the calibrated depth as determined by the length of time elapsed between the transmittal of the 1 millisecond transmit pulse and the receipt of the echo by the receiver circuitry.

During the receiver time period, the transmitter modulator pulse keeps the clamp transistor Q4 normally on to turn the transmitter oscillator circuit comprising Q5 and Q6 off in the receiver mode. With Q4 on, the bias reference current Io is passed to ground and transistor Q7 is off. The TX MOD pulse also keeps the clamp transistor Q8 normally on to maintain the transistor Q9 leading to the transmitter circuit off in the receiver mode.

Now, in the transmit mode it is desired that a free running oscillator be set up oscillating at the reference frequency $f_o$ determined by the resonant frequency of the tuned circuit 18, 19. The oscillator circuit comprises the emitter coupled pair of transistors Q5 and Q6 and the biasing current source Q7 that turns them on.

When transistor Q4 goes off in the transmit mode, the bias current Io enters diode D1 and transistor Q7 is biased to conduct Io to turn on the oscillator. The zener diodes Z1 and Z2 are provided, Z1 providing a level shift to the base of Q5 and zener Z2 from the tank circuit down to the base of Q6. This circuit is a standard emitter coupled two terminal oscillator where the tank circuit 18, 19 is in the collector of transistor Q5.

Thus, a sine wave appears across the tank circuit 18, 19 with a nicely controlled amplitude due to the limiting of the bias current at Q7. The frequency of oscillation is $f_o$, the resonant frequency of the LC circuit.

Due to this sine wave, transistor Q3 is turned on and off alternately at the same rate. Thus, the normal output to the pulse width discriminator will cause the neon light to light at the 0 distance flash.

The pulses coming out the second collector of Q3 pass to the base of transistor Q9 and are transmitted to the transmitter circuit. The output of Q9 is a square wave at the 200 KHz rate for the duration of the 1 millisecond transmit pulse.

To maintain high efficiency operation, the power amplifier which drives the transducer 15 during the transmit mode should be operated in the Class C mode with a small controlled conduction angle. The battery supply V+ for the system is 12 volts, and it supplies the transducer 15 through a step up transformer T1. It is desired to have about 220 volt peak-to-peak voltage across the transducer 15 as a transmit pulse.

The Darlington power pair Q10 and Q11 associated with transistor Q12 pull large currents out of the power supply, for example 1 amp, for the short 1 millisecond period, giving a ringing sine wave across the transducer 15.

In order to accomplish the very short 1 millisecond period, during the + half of the 200 KHz square wave from the collector of transistor Q9, transistor Q13 is turned on to short the main transmitter drive current $Io_3$ to ground. Transistor Q14 is turned on to short current $Io_2$ to ground.

When the input of the 200 KHz square wave at Q9 swings to ground, both Q13 and Q14 go off. The current source $Io_3$ turns Q12 on and also the Darlington power amplifier Q10 and Q11. With Q14 off, the integrating capacitor C1 begins to charge up via current $Io_2$, until a voltage of $V_{Z1} + V_{BE}$ of transistor Q15 is reached. This time interval is the 1 microsecond pulse width. At the end of this short voltage sweep, transistor Q15 comes on and shorts $Io_3$ to ground, thus terminating the 1 microsecond power pulse. The resistor R1 in the collector of Q12 limits the drive to the Darlington output Q10, Q11.

For each pulse of the 200 KHz square wave, there is thus generated a 1 microsecond long power pulse, and this train of pulses continues for the 1 millisecond transmit pulse period.

It can be seen that during the transmit time, the one LC network of the receiver is gated into a controlled amplitude sine wave oscillator which establishes the frequency for the transmitter. A pulse is then generated for each cycle and used to drive the power amplifier in a Class C mode. This gives added isolation from the transducer and allows arbitrary transducers to be interchanged and obtain same system performance.

What is claimed is:

1. A sonar system including
   a transducer for converting electrical signals to sound signals, said sound signals being transmitted to a target from which echo sound signals are thereafter returned as received signals to said transducer, a transmitter circuit for delivering radio frequency electrical signals to said transducer to create said transmitted sound signals, a receiver circuit for receiving said returned echo signals from said transducer and converting them to electrical signals, a radio frequency tuned circuit tuned to the frequency of said transmitted sound signal and said received echo signal, and means for coupling said radio frequency tuned circuit to said transmitter circuit to establish the frequency of the transmitted signal and for coupling said radio frequency tuned circuit to said receiver circuit to tune said receiver to the received echo signal.

2. A sonar system as claimed in claim 1 wherein said coupling means comprises a switching means for switching said radio frequency tuned circuit between said transmitter circuit and said receiver circuit.

3. A sonar system as claimed in claim 2 including a disk rotating at a constant speed, the periphery of the disk being calibrated in distance, a light mounted for rotation with said disk, means for lighting said light at a reference calibration distance responsible to said transmitted sound signal, and means for thereafter lighting said light responsive to the received echo signal after rotation of said disk indicative of the distance to said target.

4. A sonar system as claimed in claim 2 wherein said transmitter circuit coupled to said radio frequency tuned circuit comprises an oscillator circuit controlled by said tuned circuit, and means including a power amplifier coupled between said oscillator circuit and said transducer.

5. A sonar system as claimed in claim 4 wherein said means including the power amplifier includes a pulse forming means coupled between said oscillator means and said power amplifier with a pulse repetition rate at said oscillator frequency, said pulse forming means driving said power amplifier and said transducer at said oscillator rate.

6. A sonar system as claimed in claim 5 wherein the time width of said power driving pulse is substantially less than the half period of one cycle of said oscillator frequency.

7. A sonar system as claimed in claim 1 wherein said means for coupling said radio frequency tuned circuit to said transmitter circuit and to said receiver circuit provides means for isolating said tuned circuit from the impedance of said transducer to prevent the impedance of said transducer from changing the resonant frequency of said tuned circuit.

8. A sonar system as claimed in claim 7 wherein said coupling means comprises a switching means for switching said radio frequency tuned circuit between said transmitter circuit and said receiver circuit.

9. A sonar system as claimed in claim 8 wherein said transmitter circuit coupled to said radio frequency tuned circuit comprises an oscillator circuit controlled by said tuned circuit, and means including a power amplifier coupled between said oscillator circuit and said transducer.

10. A sonar system as claimed in claim 9 wherein said means including the power amplifier includes a pulse forming means coupled between said oscillator means and said power amplifier with a pulse repetition rate at said oscillator frequency, said pulse forming means driving said power amplifier and said transducer at said oscillator rate.

11. A sonar system as claimed in claim 10 wherein the time width of said power driving pulse is substantially less than the half period of one cycle of said oscillator frequency.

12. A sonar system as claimed in claim 8 including a disk rotating at a constant speed, the periphery of the disk being calibrated in distance, a light mounted for rotation with said disk, means for lighting said light at a reference calibration point responsive to said transmitted sound signal, and means for thereafter lighting said light responsive to the received echo signal and indicative of the distance to said target.

13. The method of transmitting a sonar signal from a transducer and for receiving back an echo signal by said transducer including the steps of converting electrical signals by said transducer to sound signals, said sound signals being transmitted to a target from which echo sound signals are thereafter returned as received signals to said transducer and converted to electrical signals, transmitting radio frequency electrical signals from a transmitter to said transducer to create said transmitted sound signals, receiving said returned echo signals from said transducer and converting them to electrical signals by a receiver circuit, providing a radio frequency tuned circuit tuned to the frequency of said transmitted sound signal and said received echo signal, and coupling said radio frequency tuned circuit first to said transmitter circuit to establish the frequency of the transmitted signal and for thereafter coupling said radio frequency tuned circuit to said receiver circuit to tune said receiver to the received echo signal.

14. The method as claimed in claim 13 comprising the step of switching said coupling between said transmitter circuit and said receiver circuit.

15. The method as claimed in claim 13 including the steps of rotating a disk at a constant speed, the periphery of the disk being calibrated in distance, mounting a light for rotation with said disk, lighting said light at a reference calibration distance responsive to said transmitted sound signal, and thereafter lighting said light responsive to the received echo signal after rotation of said disk indicative of the distance to said target.

16. The method as claimed in claim 13 including the step of providing an oscillator circuit in said transmitter circuit and coupled to said radio frequency tuned circuit, said oscillator circuit being controlled by said tuned circuit, and providing a power amplifier coupled between said oscillator circuit and said transducer.

17. The method as claimed in claim 16 including the step of providing a pulse forming means coupled between said oscillator circuit and said power amplifier to produce a pulse repetion rate at said oscillator frequency, and driving said power amplifier and said transducer at said pulse repetition rate.

18. The method as claimed in claim 17 wherein the time width of said power driving pulse is substantially less than the half period of one cycle of said oscillator frequency.

19. The method as claimed in claim 13 including the step of isolating said tuned circuit from the impedance of said transducer to prevent said transducer impedance from changing the resonant frequency of said tuned circuit.

* * * * *